United States Patent [19]

Painley

[11] Patent Number: 4,598,594
[45] Date of Patent: Jul. 8, 1986

[54] PULSE GENERATOR
[75] Inventor: Elmer F. Painley, Uniontown, Pa.
[73] Assignee: Rockwell International Corporation, Pittsburgh, Pa.
[21] Appl. No.: 732,536
[22] Filed: May 10, 1985
[51] Int. Cl.⁴ ............................................. G01F 15/06
[52] U.S. Cl. .................................. 73/861.78; 310/36; 310/75 A; 310/84
[58] Field of Search ................. 73/861.77, 861.78; 310/36, 69, 75 A, 79, 84

[56]  References Cited
U.S. PATENT DOCUMENTS

| | | | |
|---|---|---|---|
| 3,555,902 | 1/1971 | Onoda et al. | 73/861.78 |
| 3,599,022 | 8/1971 | Adair | 310/75 A |
| 3,685,353 | 8/1972 | Gestler | 73/861.78 |
| 3,772,917 | 11/1973 | Lutz | 73/861.78 |
| 4,020,689 | 5/1977 | Onoda et al. | 73/75 A |
| 4,409,848 | 10/1983 | Lutz | 73/861.78 |

Primary Examiner—Herbert Goldstein

[57] ABSTRACT

An impulse generator for a fluid meter register is comprised of a rotatable armature which produces a magnetic field and which is intermittently driven by the register gear train against the bias of a spring. When released from the gear train the armature rotates under the influence of the spring, the magnetic field acting on the turns of a coil to produce a voltage pulse in the coil. A release mechanism between the armature and the register gear train is arranged so that the resisting torque applied to the gear train by the spring when the armature is driven against the spring bias, is substantially constant.

7 Claims, 10 Drawing Figures

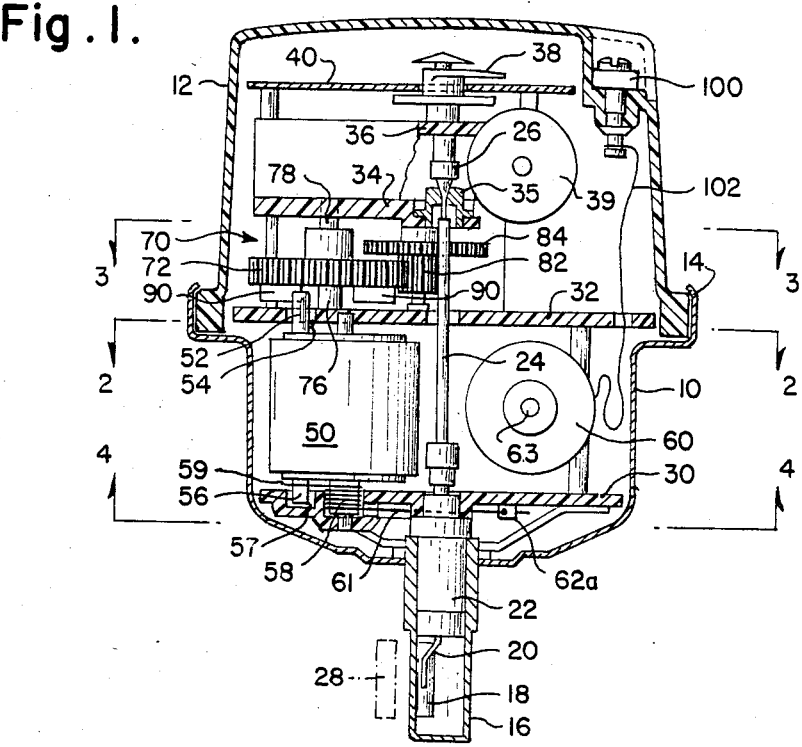

PULSE GENERATOR

BACKGROUND OF THE INVENTION

1. Field of the Invention

This invention relates to pulse generating means which are mounted on utility meters such as water meters and gas meters. The meters drive the pulse generator which produces an electrical pulse for a given volume of flow through the meter which pulse is transmitted by means of an electrical connection or other known transmission means to a pulse counter located remote from the meter, usually on the exterior wall of the residence to facilitate meter reading without access to the interior of the residence where the meter is located.

2. Background of the Invention and Description of the Prior Art

The present invention is an improvement to the pulse generating means shown in U.S. Pat. No. 3,685,353 to Gestler et al dated Aug. 22, 1972. In that patent a pulse generator is disclosed comprised of a gear train which is coupled to the flow responsive element of the water meter by means of a magnetic coupling. As the flow responsive element moves under the influence of the flow of water through the meter, the gear train within the pulse generator is driven, which in turn rotates a coil against the bias of a spring. After the coil has rotated approximately 1800° the coil is disengaged from the drive train and allowed to rapidly return to its initial position under the force of the spring. The rapid return of the coil to its initial position causes the turns of the coil to cut lines of force produced by a permanent magnet which causes a momentary voltage to be generated in the turns of the coil in a manner manner well known in the art. This voltage pulse is then transmitted to a pulse counter which is usually located remote from the meter.

In that patent the release mechanism is comprised of a camming vane driven by a gear train which in turn is driven by the flow responsive element of the meter. The camming vane is mounted for rotation about an axis which is offset from the axis of rotation of the rotatable coil. The camming vane engages a drive pin on the coil and as the camming vane rotates, because of the offset relationship between the axis of rotation of the vane and the coil, the pin moves radially outward on the camming vane until it is disengaged from the camming vane at its radially outermost point. The coil is then disengaged from the drive train and allowed to rapidly return to its initial position under the bias of the spring.

As the pin and coil are driven by the vane about the axis of the coil, the return spring on the coil causes the pin to exert an increasing force against the vane and the rest of the register drive train. As the pin moves radially outward away from the axis of the vane, the resisting torque applied to the vane by the spring is also increased by increase in the lever arm at which the force of the spring is applied to the vane. Therefore the back load or resisting torque which the rotatable coil imposes on the drive train is increased not only by the increase in spring force as the coil is rotated against the bias of the spring, but also by the increase in the lever arm at which the biasing force of the spring is applied to the drive train. This non-uniform backload has a range of maximum and minimum values which require that the strength of the magnetic coupling between the flow responsive element of the meter and the register drive, as well as other elements in the drive train be designed for maximum backload. Obviously if the backload could be made more uniform design of the drive train and magnetic coupling would be greatly simplified.

SUMMARY OF THE INVENTION

Applicants have overcome the problems inherent in the prior art by devising a drive arrangement between the drive pin on Applicants' armature and the camming vane in which the resisting torque imposed on the drive train by the armature is essentially uniform throughout the pulse generating cycle. This has been accomplished by forming camming vanes on a cam wheel which are oriented at an acute angle with respect to the radius of the cam wheel and driving the pin on the armature in a manner whereby the pin moves radially inward as the cam wheel and armature rotate. When the pin reaches the innermost limit of the cams on the cam wheel the pin and armature are disengaged from the drive train allowing the armature of the generator to quickly return to its initial position. Since the pin moves radially inward during the drive cycle the lever arm at which the resisting force of the spring bias is applied to the cam wheel is decreasing throughout the drive cycle which offsets the increase in the biasing force of the return spring. Thus the backload which the rotatable armature of the generator imposes on the drive train remains essentially uniform throughout the pulse generating cycle.

DESCRIPTION OF THE DRAWINGS

FIG. 1 is a vertical section through a register housing showing the various elements of Applicants' pulse generating means.

FIG. 2 is a horizontal section taken along the lines 2—2 of FIG. 1, in the direction of the arrows.

FIG. 3 is a horizontal section taken along the lines 3—3 of FIG. 1, in the direction of the arrows.

DESCRIPTION OF THE PREFERRED EMBODIMENT

Figure 4:
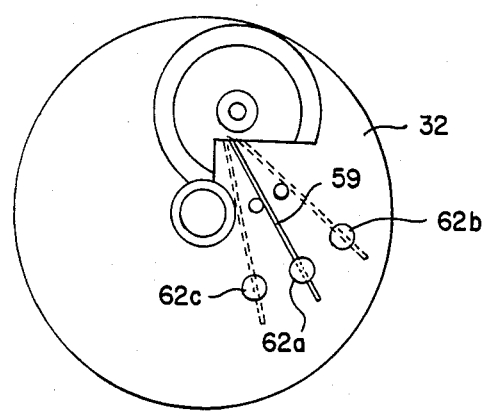
FIG. 4 is a view taken along line 4—4 of FIG. 1 in the direction of the arrows.

Referring particularly to FIG. 1 a register housing is comprised of a lower housing 12 of suitable metal such as stainless steel and an upper member 12 which may be formed of a transparent or translucent material such as lucite. The two parts are sealingly joined together at the junction 14 where the lower part is rolled over into sealing engagement with the upper housing 12. A tubular wall portion 16 projects downwardly from the bottom of the housing member 10 and is adapted to project into the measuring chamber of a water meter in a manner similar to that shown in U.S. Pat. No. 3,093,307 dated June 11, 1963. The entire structure assembly of housings 10 and 12 and portion 16 comprises a sealed unit.

A permanent magnet 18 is contained within the lower portion of the well portion 16 and is adapted to move freely around the internal surface thereof. Magnet 18 is the driven member of a magnetic coupling, the driving member 28, shown in phantom lines, being a permanent magnet carried by the flow responsive element of a water meter such as shown in U.S. Pat. No. 3,093,307. A crank 20 is journaled for rotation in a bearing housing 22 and is drivingly connected to a drive shaft 24 which has a drive pinion 26 mounted at its upper end for rotation with the shaft. It will be appreciated that as the driving magnet 28 is caused to orbit about the axis of rotation of crank 20 by the motion of the flow responsive member in the meter, the magnet 18 will be caused to roll around the interior of the portion 16 and will turn the crank 20.

Lower mounting plate 30 is secured within the lower part of housing 10 and serves to support an intermediate mounting plate 32 which in turn supports upper mounting plates 34 and 36. Drive shaft 24 is journaled near its upper end in bearing 35 which is supported on plate 34. Drive pinion 26 is fixed for rotation with the drive shaft 24 above plate 34. The upper end of drive shaft 24 is also coupled to and drives a pointer 38 which rotates relative to an indicator plate 40 on which volumetric flow through the meter is indicated in relatively low volumes, for example, in tenths of a gallon. Drive pinion 26 is drive coupled (by means not shown) to a digital counter 39 to provide a readout of the volume of flow through the meter.

An armature identified generally by the numeral 50 is rotatably mounted between plates 30 and 32. A drive post 52, radially offset from the axis of the armature 50 projects from the upper end of the armature through an arcuate slot 54 formed in plate 32. At the lower end of the armature 50 a stop pin 56 radially offset from the axis of the armature projects into an arcuate groove 57 formed in the lower plate 30. A coil spring 58 encircles the lower portion of the armature 50, one end 59 of the coil spring being in engagement with the stop post 56 the other end 61 of the coil being engaged by an anchor post 62a formed on plate 30. The spring 58 is tensioned so that the armature 50 is biased in a clockwise direction as viewed in FIGS. 2 and 6A-6E, the limit of its movement in that direction being defined by the point where the stop post 56 engages the end of the arcuate slot 57 formed in lower plate 30. Referring to FIG. 4, three anchor posts 62a, 62b and 62c are provided any one of which can be engaged by spring end 59. Coil springs of the type employed herein as obtained from the manufacturer can vary as much as ±10% in the amount of biasing force they will provide for a given pre-loaded angular position of anchor end 62a. Thus in order that the armature have the proper bias, three alternative anchor posts 62a, 62b and 62c are provided any one of which can be used to anchor spring end 59 to give the proper bias for variations the spring characteristic.

Figure 5:
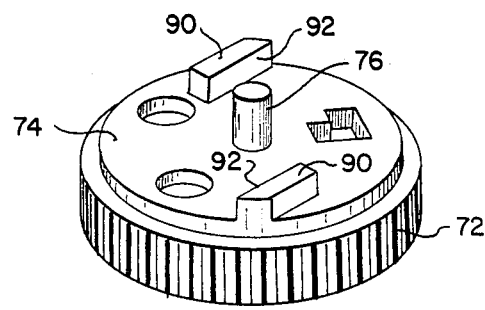
FIG. 5 is a perspective view of the cam-gear assembly with the bottom side of the assembly facing upwardly to more clearly illustrate the vanes.

As best shown in FIGS. 1 ano 2, a generating coil 60 has a core 63 from which core extensions 64 extend, the outer extremities of which are arcuately formed to extend in close proximity to a portion of the periphery of the armature 50. As best shown in FIGS. 2 and 5, the armature 50 carries an outer cylindrical permanent magnet 64 which is polarized so that opposite poles are on diametrically opposed points on the periphery of the armature.

As shown in FIG. 1 a cam-gear assembly 70 is mounted for rotation between plates 32 and 34. FIG. 5 shows a perspective view of the assembly 70 with its lower side as mounted in FIG. 1, facing upwardly in FIG. 5. The assembly 70 is comprised of a gear wheel 72 into which a cam wheel 74 is telescopically received. A journal post 76 projects from the bottom of the cam wheel 74 and is journaled in plate 32 (FIG. 1). Post 78 on cam wheel 74 projects through the top of gear wheel 72 and is journaled in wall 34 to journal the entire assembly 70 between walls 32 and 34. Within the assembly 70 a one way drive (not shown) connects the cam wheel 74 to the gear wheel 72 so that the gear wheel can move relative to the cam wheel only in a counterclockwise direction as shown in FIG. 5 and when viewed from above in FIG. 1. This allows the cam wheel to be driven in a reverse direction which permits the armature bias to be pre-set so that test time is minimized and timing and synchronizing the generator to the meter index register are facilitated.

A gear assembly comprised of gear 82 and gear 84 are journaled for rotation together between walls 32 and 34. Smaller gear 82 is in driving engagement with gear wheel 72 while larger gear 84 is drive connected with drive pinion 26 by means of a gear train not shown.

With particular reference to FIGS. 1 and 5 cam vanes 90 are formed on the bottom face of cam wheel 74. Each cam has a face 92 which extends obliquely inward from the periphery of the cam wheel 74 at an angle to the radius of the cam wheel. In the assembly of FIG. 1 these cams project downwardly into the arcuate path of movement of the post 52 on armature 50.

The eccentric relationship between the cam wheel 72 and armature 50 when viewed from above in FIG. 1 and their respective axes of rotation can best be seen by reference to FIGS. 6A through 6E in which the numeral 94 represents the axis of rotation of the gear wheel 72 and cam wheel 74 and the number 96 represents the axis of rotation of the armature 50.

As the magnet 18 and drive shaft 24 are driven by the magnet 28 carried by the flow responsive element of the meter, the gear 84 is driven in a clockwise motion as viewed from above in FIG. 1 by means of a gear train (not shown) between the drive pinion 26 and the gear 84. Clockwise rotation of the gear 84 and the associated gear 82 causes the gear wheel 72 to rotate in a counterclockwise direction as viewed from above in FIG. 1. Since the one way drive connection between the cam wheel 74 and the gear wheel 72 will permit only counterclockwise motion of the gear 72 relative to the cam wheel 74, the cam wheel 74 rotates in a counterclockwise direction as viewed in FIGS. 6A-6E.

Figure 6A:
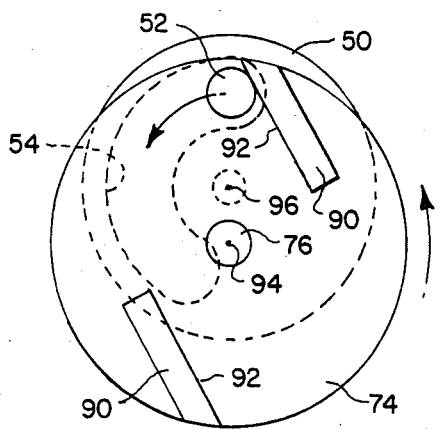
FIGS. 6A–6E; are schematic drawings showing the relative positions of the cam wheel vanes and the drive pin of the armature as the system moves from its initial position to the position of disengagement between the cam-gear assembly and the armature.

FIG. 6A shows the position of the various elements at the beginning a pulse generating drive cycle. In this position drive pin 52 on armature 50 is engaged by the surface 92 at the outer extremity of one of the cam vanes 90.

Figure 6B:
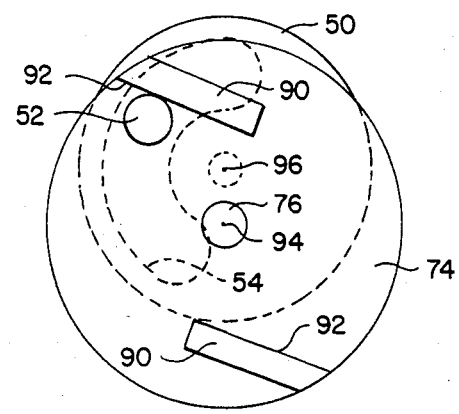
Figure 6C:
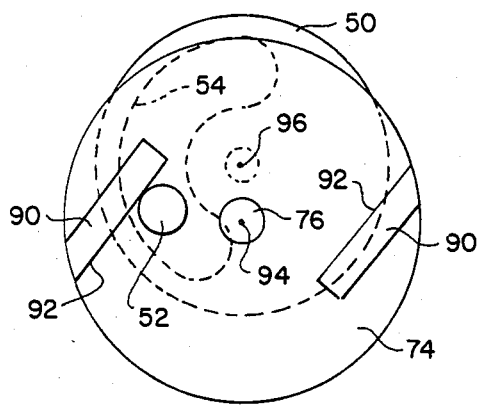
Figure 6D:
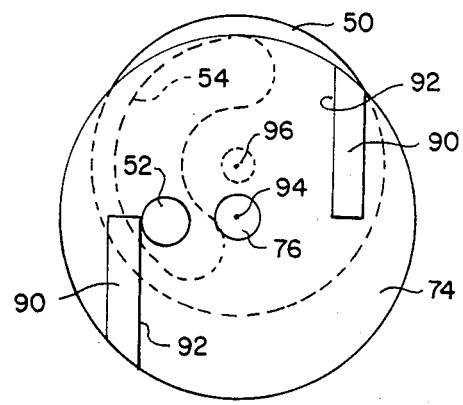
Figure 6E:
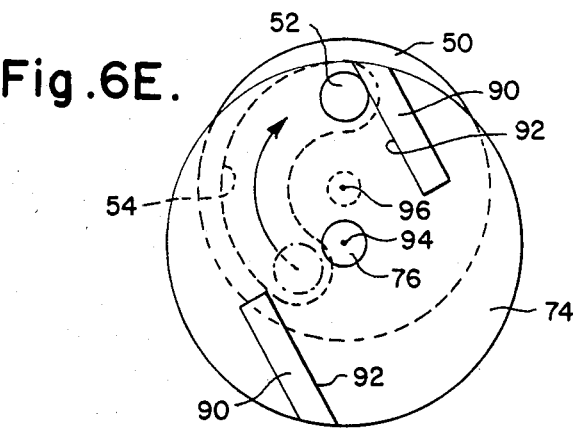

As the pin 52 is driven by the vane 90 the armature 50 is caused to rotate around its axis against the biasing force of the spring 58, the magnitude of which force increases as the armature rotates through the cycle towards its position of disengagement with the assembly 70. Since the axis 96 of the armature 50 is displaced from the axis 94 of the assembly 70, the pin 52 moves inwardly away from the periphery of the cam wheel 74 as the assembly 70 and armature 50 are driven through successive intermediate positions as shown in FIGS. 6B, 6C and 6D. When the elements reach the positions shown in FIG. 6E the pin 52 is disengaged from vane 90 and the armature is allowed to snap back to its initial position as determined by the limit of arcuate groove 57 formed in bottom wall 30. The magnetic lines of flux eminating from the armature 50 are transferred through core extensions 64 to the core 63 through the coil 60. The rapid return movement of the armature to its original position causes a rapid growth and decay and a reversal of the polarity in the magnetic field to which the coil is subjected, which induces a momentary voltage in the coil in a well known manner. This voltage is transmitted to terminals 100 by means of two lead wires 102, only one of each of the lead wires and terminals being shown in FIG. 1. This voltage pulse is then transmitted by suitable electrical leads to a pulse counter which may be installed at some location remote from the meter, usually in an exterior wall of the building 10 which the meter is installed.

It will be understood that as the armature 50 is driven in a counterclockwise direction (as viewed in FIGS. 6A-6E), it is driven against the biasing force of spring 58. Thus during the drive portion of the cycle, the armature imposes a resisting torque on the drive train extending back from the assembly 70 to the magnetic coupling between magnets 18 and 28 and the flow responsive element of the meter. The magnitude of this torque is the product of the force with which the spring 58 resists counterclockwise rotation of the armature and the lever arm at which this force is applied to the gear train system. This lever arm is the distance at any given point in the drive cycle between the pin 52 and the axis 94 of the assembly 70.

In prior art devices such as that exemplified in U.S. Pat. No. 3,685,535, the drive pin moves outwardly along the surface of the driving vane away from the axis about which the drive vane rotates as the pin is driven through its cycle. Thus, the resisting torque imposed on the gear train system is increased throughout the driving portion of the cycle not only because of the increase in the force of the biasing spring as it is wound by rotation of the armature on which the pin is located, but also because the lever arm at which the force of the spring is applied to the gear train system is increased.

It will be noted that in the arrangement disclosed in U.S. Pat. No. 3,685,535 the axis of rotation of the drive vane is located between the axis of rotation of the armature and the drive pin when in its position of initial contact with the drive vane. An essential difference in applicant's arrangement is that the axis of rotation of the armature is located between the axis of rotation of the drive vane and the drive pin at its position of initial contact with the drive vane. As a result in applicant's arrangement as the armature 50 is driven against the bias of its spring 58, the pin 52 moves inwardly along the surface 92 of one of the vanes 90 until disengagement with the vanes at its innermost extremity so that while the force of the spring is increased throughout the driving portion of the cycle, the lever arm at which it is applied to the system is decreased.

Thus the effect of the reduction of the lever arm compensates for the increase in the spring bias as the armature is driven through the driven portion of its cycle, so that the resultant effect is a resisting torque on the drive train system which remains essentially constant throughout the drive portion of the cycle. Since the torque against which the magnetic coupling 18-28 and the drive train between the flow responsive element of the meter remains uniform throughout the pulse generating cycle the design of these elements is greatly facilitated.

I claim:

1. An impulse generator adapted to be driven by the flow responsive element of a fluid meter comprising: a rotatable armature, a drive shaft drive coupled to said flow responsive element, means for releaseably coupling said armature to said drive shaft comprising; a cam member rotatable about an axis parallel to the axis of said armature and having at least one cam surface extending inwardly from a point remote from the axis of rotation of said cam member and terminating at a point spaced from the axis of rotation of said cam member, means for driving said cam member from said drive shaft, a drive pin on said armature projecting into the path of movement of said cam surface, the axis of rotation of said armature being located at a point between the axis of rotation of said cam member and said drive pin when said drive pin is in its position of initial engagement with said cam surface, and biasing means resiliently biasing said armature for rotation in the direction opposite to the direction of rotation of said cam member.

2. The apparatus defined in claim 1 in which said cam surface is formed at an acute included angle with the radius of rotation of said cam member.

3. The apparatus defined in claim 2 in which said cam member is provided with two of said cam surfaces of the same length and diametrically spaced from each other.

4. The apparatus defined in claim 1 together with a one-way drive connection between said cam member and said drive shaft whereby said cam member is free to rotate in one direction with respect to said drive shaft.

5. The apparatus defined in claim 1 together with adjustment means to adjust the amount of bias said biasing applies to said armature.

6. The apparatus defined in claim 5 in which said biasing means is a coil spring and said adjustment means is comprised of multiple anchor post for selective engagement by the anchor end of said spring.

7. An impulse generator adapted to be driven by the flow responsive element of a fluid meter comprising: a magnet mounted for rotation to produce a rotating magnetic field, a coil to coact with said magnetic field whereby a voltage is induced in said coil, a drive shaft, means coupling the drive shaft to the flow responsive element of said meter, means for releaseably coupling said magnet to said drive shaft comprising; a rotatable cam member having cam surfaces extending inwardly from a point remote from the axis of rotation of said cam member and terminating at a point spaced from the axis of rotation of said cam member, a drive pin on said magnet projecting into the path of movement of said cam surface, the axis of rotation of said magnet being parallel to and spaced from the axis of rotation of said cam member and located at a point between the axis of rotation of said cam member and said drive pin when said drive pin is in its position of initial engagement with said cam surface, and means resiliently biasing said magnet for rotation in the direction opposite to the direction of rotation of said cam member.

* * * * *